Dec. 31, 1929.          G. J. LEMM          1,741,242
SINK STRAINER
Filed April 28, 1928
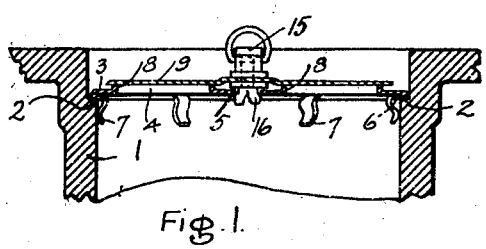
Fig. 1.
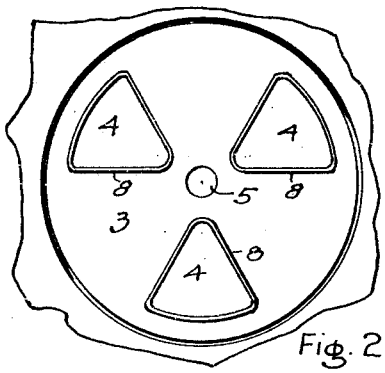
Fig. 2
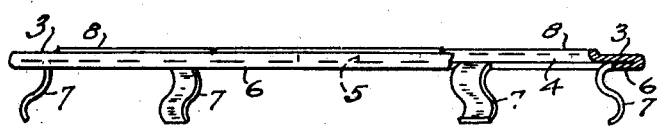
Fig. 3
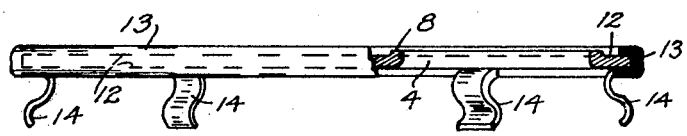
Fig. 4.
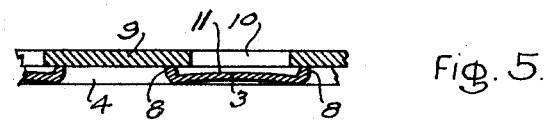
Fig. 5.
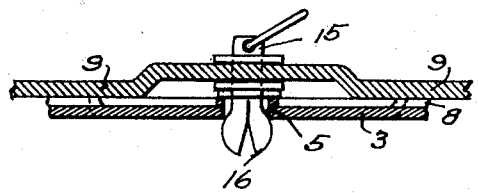
Fig. 6.
Inventor
Gotthard J. Lemm
By
Attorney Patented Dec. 31, 1929

1,741,242

UNITED STATES PATENT OFFICE

GOTTHARD J. LEMM, OF TACOMA, WASHINGTON

SINK STRAINER

Application filed April 28, 1928. Serial No. 273,659.

This invention relates to devices adapted to close the drain of the sink, when it is desired to hold the water therein, and to act as a strainer when the water is running freely therethrough. The invention is, further, a variation of a similar device patented by me on February 21st, 1928, under Number 1,660,010. The objects of this invention are, first, to provide a device which will fit any drain pipe opening of approximate corresponding size; second, which will prevent leakage around the strainer when the said opening is oversize; third, which may be quickly and easily placed in position in the drain, or be removed therefrom, and yet will hold itself firmly in place therein; fourth, which will provide a suitable flat bearing surface for the disk around each opening therein; fifth, which will provide a suitable bearing to center the disk thereof; sixth, which will firmly hold the disk thereon and yet will permit the disk to be readily removed therefrom; seventh, which will prevent the strainer from buckling out of shape; and eighth, which is cheap to make, easy to apply and operate, and effective in use.

I attain these and other objects by the devices, mechanisms and arrangements illustrated in the accompanying drawings, in which Fig. 1 is a vertical section of the upper part of a sink drain, showing one form of my improved sink strainer inserted therein, together with a stopper closing the openings therein; Fig. 2 is a plan view of the sink strainer shown in Fig. 1; Fig. 3 is a side elevation, partly in section, of the said strainer, drawn on a larger scale; Fig. 4 is a similar view of another form thereof; Fig. 5 is an enlarged view showing the upturned edges of the openings in the strainer disk to illustrate the action of the stopper thereon to close the said openings; and Fig. 6 is a similar view of the central part of the stopper and strainer, illustrating the means of connecting them together.

Similar numerals of reference refer to similar parts throughout the several views.

Referring to Fig. 1 of the drawings, it will be seen that the sink drain pipe 1 is provided with a shoulder 2, slightly below the opening. The diameter of the pipe 1 may, in practice, vary somewhat and it is therefore necessary, in producing a strainer, to make it smaller than the smallest variation of the pipe 1 above the said shoulder 2, and larger than the largest variation of the pipe 1 below the said shoulder 2. In view of this variation in the size of the pipe 1, it is evident that the strainer must prevent leakage around its periphery, and this is done, in this case, by causing the outer edge of the strainer to rest directly on the said shoulder 2.

In Figs. 3 and 4 are illustrated two different forms of the strainer disk construction, but it will be noted that they are both provided with a flat under-surface to their rims and that they are both adapted to lie flat on the shoulder 2, of the pipe 1, to prevent leakage around the strainer.

The simplest form of my improved sink strainer is illustrated especially in Fig. 3, and comprises a flat disk 3 of thin sheet metal, having drain holes 4 and a central hole 5 cut therein, and having its outer edge turned down and under, as at 6, and provided with clips 7, integral therewith, and each bent downward and outward in a reversed curve as shown, and adapted to form friction means for firmly clamping the strainer in position on the shoulder 2. Thus it will be seen that the strainer thus formed is made of a single piece of metal and is cheap to make in large quantities.

It will be observed that the metal of the disk 3, surrounding the holes 4, is turned upward to form a low flange or wall 8 around each hole. These walls 8 are all of the same height and their upper edges may be ground, if desired, to bring them all into exactly the same plane. The stopper disk 9, which may be made of any suitable material and which may have openings 10 formed therein, or which may be a continuous removable disk, rests on the said flanges or walls 8 and makes perfect contact therewith and therefore prevents leakage through the said holes 4.

However, in pressing the disk 3 to form the downturned rim 6, it is found that the metal buckles slightly at times, as indicated at 11 in Fig. 5, and therefore I have devised the form of strainer illustrated in Fig. 4, wherein the main disk 12 is provided with the drain holes but is itself mounted within a ring 13, which is formed to lie on both sides of the rim of the disk 12, around the periphery thereof, and which is provided with spring clips 14, similar to the above-described clips 7. Thus the disk 12 is relieved of the strains due to pressing the rim and does not buckle out of shape. This form of strainer, however, lies flat on the shoulder 2 in the same way as the first form thereof, the under surface of the ring 13 contacting with the shoulder. The clips 14 engage the inner surface of the drain pipe 1, below the shoulder 2, in exactly the same manner as the clips 7, above described.

The closure disk, or stopper, 9 is provided with a central pin 15, extending downward therefrom and adapted to enter the central hole 5 of the strainer disk, thereby centering it thereon and permitting it to be rotated thereon, if desired. This pin 15 may have its lower end 16 enlarged and, in some cases, it may be desirable to split said enlargement to provide a snap connection between the strainer disk and the stopper 9.

It is to be understood that the drawings have been made to show the material much thicker than it would normally be made, for the purpose of greater clearness, and that many changes in the details of construction may be made without departing from the scope of the appended claims. Also, that the stopper may be made with or without holes therein. In the latter case, the stopper is removable from the strainer disk by being vertically lifted therefrom, the pin 15 readily passing out from the hole 5, as above described. Also, in the latter case, the stopper 9 may be made of rubber or any other suitable material.

Having therefore described my invention, what I claim is:—

1. In a sink strainer, the combination of an outer enveloping ring, said ring having a flat under surface adapted to rest on the shoulder in the drain pipe; spring clips projecting downward and outward from the inner edge of the lower side of said ring and adapted to engage the inner surface of the drain pipe below the shoulder thereof to hold the ring on the shoulder; and a strainer disk having drain holes therein and lying within said ring whereby it is held in place in the drain pipe.

2. In a sink strainer, the combination of a strainer disk having holes therein; with a peripheral rim in non-leaking connection therewith and lying under said disk and extending inward from its outer edge, and having an under surface adapted to rest on the shoulder in the drain pipe; and spring clips projecting downward and outward from the inner edge of said underlying portion of the rim and adapted to engage the inner surface of the drain pipe below the shoulder thereof to hold said disk on the shoulder whereby leakage around the edge of the strainer disk is prevented.

3. In a sink strainer the combination of sheet metal disk adapted to fit in a drain pipe, said disk being subject to warping in manufacture, and having a plurality of drain holes punched therein, the edges of each said drain holes being pressed upward to form flanges surrounding said hole whereby the disk is stiffened against such warping when punched; with a single stopper disk adapted to overlie all said drain holes and to seat on the upper edges of the flanges thus formed surrounding each said drain hole, whereby all said drain holes are closed.

4. A sink strainer comprising a sheet metal disk, adapted to fit in a drain pipe, having holes punched therein, said disk being subject to warping when punched, the edges of said drain holes being pressed out of the level of said disk to form flanges around the holes, whereby the disk is stiffened against such warping when punched.

GOTTHARD J. LEMM.